US012746740B2

(12) United States Patent
Hagemann et al.

(10) Patent No.: US 12,746,740 B2
(45) Date of Patent: Sep. 29, 2026

(54) PROJECTION ARRANGEMENT COMPRISING A COMPOSITE PANE AND P-POLARIZED RADIATION

(71) Applicant: SAINT-GOBAIN GLASS FRANCE, Courbevoie (FR)

(72) Inventors: Jan-Hendrik Hagemann, Aachen (DE); Valentin Schulz, Niederzier (DE); Andreas Gomer, Kerpen (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 406 days.

(21) Appl. No.: 18/261,210

(22) PCT Filed: Feb. 3, 2022

(86) PCT No.: PCT/EP2022/052515

§ 371 (c)(1),
(2) Date: Jul. 12, 2023

(87) PCT Pub. No.: WO2022/179817

PCT Pub. Date: Sep. 1, 2022

(65) Prior Publication Data

US 2024/0083144 A1 Mar. 14, 2024

(30) Foreign Application Priority Data

Feb. 26, 2021 (EP) .................................... 21159447

(51) Int. Cl.

| | |
|---|---|
| ***B32B 17/10*** | (2006.01) |
| ***G02B 27/01*** | (2006.01) |
| ***G02F 1/1335*** | (2006.01) |

(52) U.S. Cl.

CPC .. *B32B 17/10036* (2013.01); *B32B 17/10183* (2013.01); *B32B 17/1022* (2013.01);

(Continued)

(58) Field of Classification Search

CPC ........ B32B 17/10036; B32B 17/10183; B32B 17/1022; B32B 17/10458;

(Continued)

(56) References Cited

U.S. PATENT DOCUMENTS 5,999,314 A * 12/1999 Asakura ............ B32B 17/10761 359/485.02
2004/0135742 A1 7/2004 Weber et al.

(Continued)

FOREIGN PATENT DOCUMENTS

CN 104267498 A 2/2015
CN 110520295 A 11/2019

(Continued)

OTHER PUBLICATIONS

HR International Search Report as issued in International Patent Application No. PCT/EP2022/052515, dated Apr. 11, 2022.

*Primary Examiner* — Charles S Chang
(74) *Attorney, Agent, or Firm* — CUSHMAN PARTNERS, LLC

(57) ABSTRACT

A projection arrangement includes a composite pane including transparent outer and inner panes, a thermoplastic intermediate layer, and a reflection layer, the outer pane having an outer side facing away from the thermoplastic intermediate layer and an inner side facing the thermoplastic intermediate layer and the inner pane has an outer side facing the thermoplastic intermediate layer and an inner side facing away from the thermoplastic intermediate layer, the reflection layer being arranged between the outer and inner panes and reflecting p-polarized light, the reflection layer being opaque or arranged spatially in front of an opaque background when viewed through the composite pane, and an image display device directed at the reflection layer and (Continued)

Figure 1:
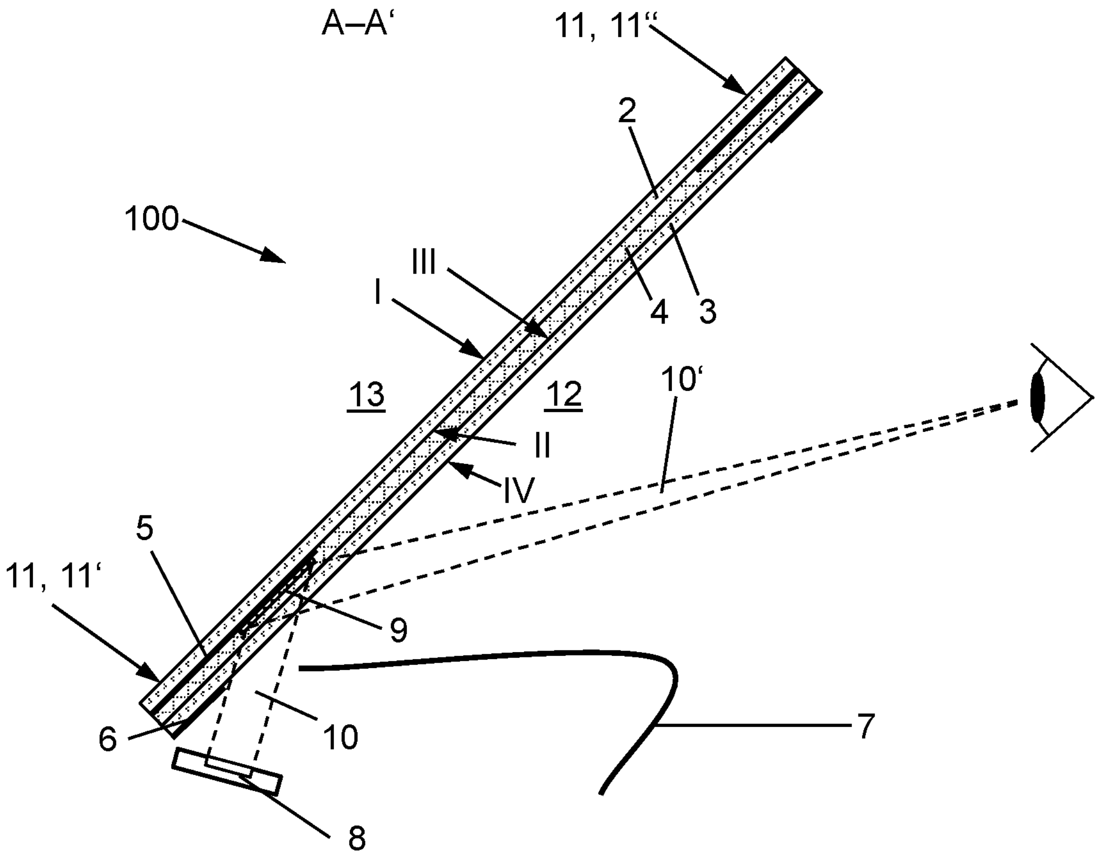

irradiates it with p-polarized light through the inner pane, wherein the reflection layer reflects the p-polarized light.

21 Claims, 5 Drawing Sheets

(52) U.S. Cl.
CPC .... *B32B 17/10458* (2013.01); *G02B 27/0101* (2013.01); *G02F 1/133536* (2013.01); *B32B 2255/205* (2013.01); *B32B 2307/412* (2013.01); *B32B 2307/416* (2013.01); *B32B 2457/202* (2013.01); *B32B 2605/08* (2013.01); *G02B 2027/012* (2013.01); *G02B 2027/0194* (2013.01)

(58) Field of Classification Search
CPC ........ B32B 2255/205; B32B 2307/412; B32B 2307/416; B32B 2457/202; B32B 2605/08; B32B 2250/40; B32B 7/023; B32B 7/12; B32B 17/10201; B32B 17/10935; G02B 27/0101; G02B 2027/012; G02B 2027/0194; G02F 1/133536
See application file for complete search history.

(56) References Cited

U.S. PATENT DOCUMENTS

| | | | |
|---|---|---|---|
| 2009/0295681 | A1 | 12/2009 | Kaminski et al. |
| 2019/0064516 | A1* | 2/2019 | Wagner .............. G02B 27/0101 |
| 2020/0333593 | A1 | 10/2020 | Bard et al. |
| 2020/0400945 | A1* | 12/2020 | Fischer ............... C03C 17/3639 |
| 2022/0334300 | A1* | 10/2022 | Sadakane .......... B32B 17/10165 |

FOREIGN PATENT DOCUMENTS

| | | | |
|---|---|---|---|
| CN | 110520782 | A | 11/2019 |
| CN | 111433023 | A | 7/2020 |
| DE | 10 2009 020824 | A1 | 2/2010 |
| DE | 10 2014 220189 | A1 | 4/2016 |
| DE | 20 2020 107202 | U1 | 2/2021 |
| EP | 3 869 245 | A1 | 8/2021 |
| JP | H10-096874 | A | 4/1998 |
| JP | 2016-009149 | A | 1/2016 |
| JP | 2019-073408 | A | 5/2019 |
| KR | 10-2005-0110614 | A | 11/2005 |
| WO | WO 96/19347 | A2 | 6/1996 |
| WO | WO 2020/080355 | A1 | 4/2020 |
| WO | WO 2021/104800 | A1 | 6/2021 |
| WO | WO 2021/209201 | A1 | 10/2021 |
| WO | WO 2022/073860 | A1 | 4/2022 |
| WO | WO 2022/073894 | A1 | 4/2022 |
| WO | WO 2022/161894 | A1 | 8/2022 |

* cited by examiner

PROJECTION ARRANGEMENT COMPRISING A COMPOSITE PANE AND P-POLARIZED RADIATION

CROSS-REFERENCE TO RELATED APPLICATIONS

This application is the U.S. National Stage of PCT/EP2022/052515, filed Feb. 3, 2022, which in turn claims priority to European patent application number 21159447.8 filed Feb. 26, 2021. The content of these applications are incorporated herein by reference in their entireties.

The invention relates to a projection arrangement, a method for production thereof, and use thereof.

Head-up displays are frequently used in vehicles and aircraft nowadays. The head-up display operates using an imaging unit, which uses an optics module and a projection surface to project an image that is perceived by the driver as a virtual image. When this image is, for example, reflected via the vehicle windshield as a projection surface, important information that significantly improves traffic safety can be displayed for the user.

Usually, vehicle windshields consist of two glass panes that are laminated to one another via at least one thermoplastic film. With the above described head-up display, the problem arises that the projector image is reflected on both surfaces of the windshield. Thus, the driver perceives not only the desired primary image, which is caused by the reflection on the interior-side surface of the windshield (primary reflection). The driver also perceives a slightly offset secondary image, usually weaker in intensity, which is caused by the reflection on the exterior-side surface of the windshield (secondary reflection). This problem is commonly resolved in that the reflecting surfaces are arranged at an angle relative to one another deliberately selected such that the primary image and the secondary image coincide, as a result of which the secondary image is no longer disturbingly noticeable.

The radiation of the head up display projector is typically substantially s-polarized due to the better reflection characteristics of the windshield compared to p-polarization. However, if the driver wears polarization-selective sunglasses that transmit only p-polarized light, he can hardly perceive the HUD image, or not at all. There is, consequently, a need for HUD projection arrangements that are compatible with polarization-selective sunglasses. A solution of the problem in this connection is, consequently, the use of projection arrangements that use p-polarized light.

DE 102014220189A1 discloses a head-up display projection arrangement operated with p-polarized radiation to generate a head-up display image. Since the angle of incidence is typically close to Brewster's angle and p-polarized light is therefore reflected only to a small extent by the glass surfaces, the windshield has a reflective structure that can reflect p-polarized light in the direction of the driver. A single metallic layer with a thickness from 5 nm to 9 nm, for example, made of silver or aluminum, which is applied on the outer side of the inner pane facing away from the interior of the passenger car, is proposed as the reflective structure.

US 2004/0135742A1 likewise discloses a head-up display projection arrangement operated with p-polarized radiation to generate a head-up display image and having a reflective structure that can reflect p-polarized radiation in the direction of the driver. The multi-ply polymer layers disclosed in WO 96119347A3 are proposed as the reflective structure.

When designing a display based on head-up display technology, care must further be taken to ensure that the projector has correspondingly high power such that the projected image has sufficient brightness, in particular in the case of incident sunlight, and is readily recognizable by the viewer. This requires a certain size of the projector and is associated with corresponding power consumption.

Unpublished European applications EP20200006.3 and EP20200009.7 show the use of a masking strip in the edge region of the windshield with a transparent element arranged in front of the masking strip that reflects the image projected onto the element into the vehicle interior. Due to the opaque background, the image can be perceived with higher contrast.

DE102009020824A1 discloses a windshield with a virtual image system. The image display device is directed toward a reflective region which is either an opaque, reflective layer itself or is arranged in front of an opaque background. The reflective layer is arranged on a face of the inner pane facing the vehicle interior. This makes the reflected image recognizable with high contrast. However, the reflective layer is not protected against external harmful influences.

In response to the problems described, the object of the present invention consists in providing an improved projection arrangement with which these these disadvantages can be avoided. For example, it would be desirable to have a projection arrangement based on head-up display technology, with which no undesirable secondary images occur and whose arrangement is relatively easy to implement with good recognizability with sufficient brightness and contrast of the image information displayed. In addition, the element provided for light reflection should be protected as much as possible against external influences, energy consumption should be relatively low, and the projection arrangement should be recognizable even with sunglasses with polarizing lenses. Furthermore, the projection arrangement should be simple and economical to manufacture.

These and other objects of the present invention are accomplished according to the invention by a projection arrangement in accordance with the independent claims 1, 14, and 15. Preferred embodiments emerge from the dependent claims.

According to the invention, a projection arrangement is described. The projection arrangement comprises a composite pane and an image display device arranged on the composite pane. The composite pane comprises a transparent outer pane, a transparent inner pane, a thermoplastic intermediate layer, and a reflection layer (mirror layer). The outer pane has an outer side facing away from the thermoplastic intermediate layer and an inner side facing the thermoplastic intermediate layer, and the inner pane has an outer side facing the thermoplastic intermediate layer and an inner side facing away from the thermoplastic intermediate layer. Preferably, the composite pane serves as a vehicle windshield.

The reflection layer is arranged between the outer pane and the inner pane, where "between" can mean both within the thermoplastic intermediate layer and in direct spatial contact, on the inner side of the outer pane and on the outer side of the inner pane. The reflection layer is suitably implemented to reflect p-polarized light, preferably visible light. The reflection layer is itself opaque or is spatially arranged in front of an opaque background when viewed through the composite pane proceeding from the inner side of the inner pane. In this context, the opaque background can be arranged on the outer side or the inner side of the outer pane or within the thermoplastic intermediate layer.

Of course, the reflection layer can itself also be opaque and still be arranged spatially in front of the opaque background when viewed through the inner pane. In the context of the invention, the region of the composite pane in which the reflection layer is arranged is opaque. If the reflection layer is arranged in front of the opaque background, the reflection layer is preferably transparent.

The present invention is based on the finding that the reflection layer in overlap with the at least one opaque background enables a good image display with high contrast to the opaque background such that it appears bright and is thus also excellently recognizable. Advantageously, this enables a reduction in the power of the image display device and, consequently, reduced energy consumption. This is a major advantage of the invention.

The expression "when viewed through the composite pane" means looking through the composite pane, proceeding from the inner side of the inner pane. In the context of the present invention, "spatially in front of" means that the reflection layer is arranged spatially farther from the outer side of the outer pane than at least the opaque background. The reflection layer can be applied directly on the opaque background. However, regardless of whether or not it is applied directly on the opaque background, the reflection layer is, when viewed through the composite pane, always in complete overlap with the opaque background. In other words, the reflection layer is thus situated, "when viewed through the composite pane", starting with the inner side of the inner pane, in overlap with the opaque background.

The image display device generates a p-polarized light, which enters the composite pane at the inner side of the inner pane and is at least partially transmitted through the inner pane. The p-polarized light is selectively projected (i.e., beamed) onto the reflection layer. The p-polarized light incident on the reflection layer is at least partially reflected and exits the composite pane at the inner side of the inner pane. The light generated by the image display device is preferably visible light, i.e., light in a wavelength range from 380 nm to 780 nm.

The radiation of the image display device preferably strikes the composite pane in the region of the reflection layer at an angle of incidence of 45° to 75°, particularly preferably of 55° to 65°, and in particular at 57°. The angle of incidence is the angle between the incidence vector of the radiation of the image display device and the surface normal in the geometric center of the reflection layer. Since the angle of incidence of about 65° typical for HUD projection arrangements is relatively close to Brewster's angle for an air/glass transition (56.5°, soda lime glass), the p-polarized radiation emitted by the image display device is hardly reflected by the pane surfaces.

The term "p-polarized light" means light from the visible spectral range that consists primarily of light with p-polarization. The p-polarized light preferably has a light proportion with p-polarization of ≥50%, preferably of ≥70%, and particularly preferably of ≥90% and in particular of approx. 100%.

The indication of the polarization direction refers to the plane of incidence of the radiation on the composite pane. The expression "p-polarized radiation" refers to radiation whose electric field oscillates in the plane of incidence. "S-polarized radiation" refers to radiation whose electric field oscillates perpendicular to the plane of incidence. The plane of incidence is generated by the vector of incidence and the surface normal of the composite pane in the geometric center of the irradiated region.

In other words, the polarization, i.e., in particular the proportion of p- and s-polarized radiation, is determined at a point of the region irradiated by the image display device, preferably in the geometric center of the irradiated region. Since composite panes can be curved (for example, when designed as a windshield), which affects the plane of incidence of the image display device radiation, polarization proportions deviating slightly from this can occur in the remaining regions, which is unavoidable for reasons of physics.

The opaque background is preferably an opaque masking strip. The masking strip is preferably a coating comprising one or more layers. Alternatively, however, it can also be an opaque element inserted into the composite pane, for example, a film.

According to a preferred embodiment of the composite pane, the masking strip consists of a single layer. This has the advantage of particularly simple and economical production of the composite pane, since only a single layer has to be formed for the masking strip.

In addition to the mode of action described in the context of the invention, it can serve as masking of structures otherwise recognizable through the pane in the installed state. In particular, in the case of a windshield, the masking strip serves to mask an adhesive bead for gluing the windshield into a vehicle body. This means it prevents viewing the usually irregularly applied adhesive bead from the outside such that a harmonious overall impression of the windshield is created. On the other hand, the masking strip serves as UV protection for the adhesive material used. Continuing irradiation with UV light damages the adhesive and, over time, would loosen the bond of the pane to the vehicle body. In the case of panes with an electrically controllable functional layer, the masking strip can, for example, also be used to conceal bus bars and/or connection elements.

The masking strip is preferably printed onto the outer pane, in particular by screen-printing. The printing ink is pressed through a fine-meshed fabric onto the glass pane. The printing ink is, for example, pressed through the fabric with a rubber squeegee. The fabric has regions permeable to the printing ink and regions impermeable to the ink, which define the geometric shape of print. The fabric thus acts as a stencil for the print. The printing ink contains at least one pigment and glass frits suspended in a liquid phase (solvent), for example, water or organic solvents such as alcohols. The pigment is typically a black pigment, for example, carbon black, aniline black, bone black, iron oxide black, spinel black, and/or graphite.

After the ink is printed, the glass pane is subjected to a temperature treatment, in which the liquid phase is expelled by evaporation and the glass frits are melted and permanently bonded to the glass surface. The temperature treatment is typically carried out at temperatures in the range from 450° C. to 700° C. The pigment remains as a masking strip in the glass matrix formed by the molten glass frits. The masking strip preferably has a thickness of 5 μm to 50 μm, particularly preferably of 8 μm to 25 μm.

Alternatively, the masking strip is a colored or pigmented, preferably black pigmented, thermoplastic composite film, preferably based on polyvinyl butyral (PVB), ethyl vinyl acetate (EVA), or polyethylene terephthalate (PET), preferably PVB. The coloring or pigmentation of the composite film can be freely selected, but is preferably black. The colored or pigmented composite film is preferably arranged between the outer pane and the inner pane; however, it is not arranged on the outer side of the inner pane. The colored or pigmented thermoplastic composite film preferably has a thickness of 0.25 mm to 1 mm. Preferably, the colored or pigmented composite film extends over a maximum of 50% and particularly preferably a maximum of 30% of the surface of the composite pane. In order to avoid thickness differences in the composite pane, a transparent further thermoplastic composite film is arranged between the outer pane and the inner pane, which extends over at least 50%, preferably at least 30%, of the surface of the composite pane. The colored or pigmented composite film is arranged in the surface plane of the composite pane offset from the transparent thermoplastic composite pane such that they do not overlap or coincide.

The masking strip can also be a thermoplastic composite film pigmented or colored in some areas. In this case, the reflection layer is arranged spatially in front of a pigmented or colored area of the thermoplastic composite film. The pigmentation or coloring of the composite film preferably extends over an area of at most 50% and particularly preferably of at most 30% of the surface of the composite pane. The remaining part of the thermoplastic composite film pigmented or colored in some areas is transparent, i.e., implemented without pigmentation or coloring. The thermoplastic composite film pigmented or colored in some areas preferably extends over the entire surface of the composite pane. Implementing the masking strip as a pigmented or colored thermoplastic composite film or as a thermoplastic composite film pigmented or colored in some areas simplifies the production of the composite pane and improves its stability. It is very advantageous for the outer pane or the inner pane not to have to be coated in advance in order to create an opaque background, as this can adversely affect the stability of the composite pane and process efficiency.

The outer pane and the inner pane preferably contain or are made of glass, particularly preferably flat glass, float glass, quartz glass, borosilicate glass, soda lime glass, aluminosilicate glass, or clear plastics, preferably rigid clear plastics, in particular polyethylene, polypropylene, polycarbonate, polymethyl methacrylate, polystyrene, polyamide, polyester, polyvinyl chloride, and/or mixtures thereof.

The outer pane and the inner pane can have further suitable coatings known per se, for example, antireflection coatings, nonstick coatings, scratch-resistant coatings, photocatalytic coatings, or sun shading coatings or low-E coatings.

The thickness of the individual panes (outer pane and inner pane) can vary widely and be adapted to the requirements of the individual case. Preferably, panes with the standard thicknesses from 0.5 mm to 5 mm and preferably from 1.0 mm to 2.5 mm are used. The size of the panes can vary widely and is governed by the use.

The composite pane can have any three-dimensional shape desired. Preferably, the outer pane and the inner pane have no shadow zones such that they can, for example, be coated by cathodic sputtering. Preferably, the outer pane and the inner pane can be flat or slightly or strongly curved in one or a plurality of spatial directions.

In the context of the present invention, “transparent” means that the total transmittance of the composite pane complies with the legal requirements for windshields (for example, the directives of the European Union ECE-R43) and an preferably has transmittance for visible light of more than 50% and in particular of more than 60%, for example, more than 70%. Thus, “transparent inner pane” and “transparent outer pane” means that the inner pane and the outer pane are transparent such that through-vision through a through-vision region of the composite pane meets the legal requirements for windshields. Accordingly, “opaque” means light transmittance of less than 10%, preferably less than 5%, and in particular 0%.

In the context of the invention, “transparent outer pane” and “transparent inner pane” mean that through-vision through the inner pane and the outer pane is possible. Preferably, the level of light transmittance of the transparent outer pane and the transparent inner pane is at least 55%, particularly preferably at least 60%, and in particular at least 70%.

When a layer is based on a material, the layer consists for the most part of this material, in particular substantially of this material in addition to any impurities or dopants.

The thermoplastic intermediate layer contains or is made of at least one thermoplastic, preferably polyvinyl butyral (PVB), ethylene vinyl acetate (EVA), and/or polyurethane (PU) or copolymers or derivatives thereof, optionally in combination with polyethylene terephthalate (PET). The thermoplastic intermediate layer can, however, also contain, for example, polypropylene (PP), polyacrylate, polyethylene (PE), polycarbonate (PC), polymethyl methacrylate, polyvinyl chloride, polyacetate resin, casting resin, acrylate, fluorinated ethylene-propylene, polyvinyl fluoride, and/or ethylene tetrafluoroethylene, or a copolymer or mixture thereof.

The thermoplastic intermediate layer is preferably implemented as at least one thermoplastic composite film and contains or is made of polyvinyl butyral (PVB), particularly preferably of polyvinyl butyral (PVB) and additives known to the person skilled in the art, such as plasticizers. Preferably, the thermoplastic intermediate layer contains at least one plasticizer.

Plasticizers are chemical compounds that make plastics softer, more flexible, smoother, and/or more elastic. They shift the thermoelastic range of plastics to lower temperatures such that the plastics have the desired more elastic properties in the range of the temperature of use. Preferred plasticizers are carboxylic acid esters, in particular low-volatility carboxylic acid esters, fats, oils, soft resins, and camphor. Other plasticizers are preferably aliphatic diesters of tri- or tetraethylene glycols. Particularly preferably used as plasticizers are 3G7, 3G8, or 4G7, where the first digit indicates the number of ethylene glycol units and the last digit indicates the number of carbon atoms in the carboxylic acid portion of the compound. Thus, 3G8 represents triethylene glycol-bis-(2-ethyl hexanoate), in other words, a compound of the formula C4H9CH (CH2CH3) CO (OCH2CH2) 3O2CCH (CH2CH3) C4H9.

Preferably, the thermoplastic intermediate layer based on PVB contains at least 3 wt.-%, preferably at least 5 wt.-%, particularly preferably at least 20 wt.-%, even more preferably at least 30 wt.-%, and in particular at least 35 wt.-% of a plasticizer. The plasticizer contains or is made, for example, of triethylene glycol-bis-(2-ethyl hexanoate).

The thermoplastic intermediate layer can be formed by a single film or, also, by more than one film. The thermoplastic intermediate layer can be formed by one or more thermoplastic films arranged one above another, with the thickness of the thermoplastic intermediate layer preferably being from 0.25 mm to 1 mm, typically 0.38 mm or 0.76 mm.

The thermoplastic intermediate layer can also be a functional thermoplastic intermediate layer, in particular an intermediate layer with acoustically damping properties, an infrared-radiation-reflecting intermediate layer, an infrared-radiation-absorbing intermediate layer, and/or a UV-radiation-absorbing intermediate layer. For example, the thermoplastic intermediate layer can also be a band filter film that blocks out narrow bands of visible light.

The reflection layer is suitably designed to reflect light, preferably visible light, of the image display device. The reflection layer reflects, with reflectance of preferably 30% or more, preferably 50% or more, most particularly 70% or more, and in particular 90% or more of the p-polarized light from the image display device incident on the reflection layer. Reflectance describes the proportion of the total incident radiation that is reflected. It is indicated in % (based on 100% incident radiation) or as a unitless number from 0 to 1 (normalized to the incident radiation). Plotted as a function of the wavelength, it forms the reflection spectrum. The statements concerning the reflectance for p-polarized radiation refer, in the context of the present invention, to the reflectance measured at an angle of incidence of 65° relative to the surface normal on the interior side. The data concerning reflectance or the reflectance spectrum refer to a reflection measurement with a light source that emits uniformly in the spectral range under consideration, with a normalized radiation intensity of 100%.

According to a preferred embodiment of the projection arrangement according to the invention, the image display device, which can also be referred to as display, can be implemented as a liquid crystal display (LCD), thin-film transistor display (TFT), light-emitting diode display (LED), organic light-emitting diode display (OLED), electroluminescent display (EL), microLED display, or the like, preferably as an LCD display. Due to the high reflection of p-polarized light, energy-intensive projectors, such as those usually used in head-up display applications, are not necessary. The display variants mentioned and other similar energy-saving image display devices are sufficient. As a result, energy consumption can be reduced.

Preferably, the projection arrangement according to the invention has at least the masking strip in an edge region of the composite pane that is typically adjacent the pane edge of the pane. The great advantage of this arrangement results from the use of the composite pane in a vehicle as a windshield, as the opaque edge region is thus outside the driver's field of vision.

The masking strip can, in principle, be arranged on either side of the outer pane. In the case of a composite pane, this is preferably applied to the inner side of the outer pane, where it is protected against external influences.

According to a preferred embodiment of the projection arrangement according to the invention, the reflection layer is arranged on the outer side of the inner pane, which enables simple production. It has been found that with this arrangement, the proportion of reflected light is particularly high, since transmittance of the p-polarized light through the thermoplastic intermediate layer is avoided.

According to another preferred embodiment of the projection arrangement according to the invention, the reflection layer is arranged on the inner side of the outer pane on the (opaque) masking layer. It has been found that with this arrangement, the proportion of the reflected light with p-polarization is particularly high. One or more additional layers can be arranged between the masking layer and the reflection layer.

According to another preferred embodiment of the projection arrangement according to the invention, in addition to the first masking strip on the inner side of the outer pane, at least one further masking strip is arranged on the outer side of the inner pane and/or on the inner side of the inner pane. The further masking strip serves to improve adhesion of the outer pane and the inner pane and is preferably mixed with ceramic particles that give the masking strip a rough and adhesive surface, which, on the inner side of the inner pane, for example, supports the gluing of the composite pane into the car body. On the outer side of the inner pane, this supports the lamination of the two individual panes of the composite pane. A further masking strip applied on the inner side of the inner pane can also be provided for aesthetic reasons, for example, to conceal the edge of the reflection layer or to shape the edge of the transition to the transparent region.

According to another preferred embodiment of the projection arrangement according to the invention, the masking strip is preferably provided with a widening in a section in which the reflection layer is in overlap with the masking strip on the inner side of the outer pane. This means that the masking strip has a greater width (dimension perpendicular to extension) than in other sections. In this way, the masking strip can be suitably adapted to the dimensions of the reflection layer. The masking strip is also formed surrounding the edge region.

The reflection layer preferably includes at at least one metal selected from the group consisting of aluminum, tin, titanium, zirconium, hafnium, vanadium, niobium, tantalum, chromium, manganese, iron, cobalt, rhodium, iridium, nickel, palladium, platinum, copper, silver, gold, or mixed alloys thereof. Independently, or additionally, the reflection layer can contain silicon oxide.

In one particular embodiment of the invention, the reflection layer is a coating containing a thin-film stack, i.e., a layer sequence of thin individual layers. This thin-film stack contains one or more electrically conductive layers based on silver. The electrically conductive layer based on silver gives the reflection coating the basic reflecting properties and also an IR reflecting effect and electrical conductivity. The electrically conductive layer is based on silver. The conductive layer preferably contains at least 90 wt.-% silver, particularly preferably at least 99 wt.-% silver, most particularly preferably at least 99.9 wt.-% silver. The silver layer can have dopants, for example, palladium, gold, copper, or aluminum. Materials based on silver are particularly suitable for reflecting p-polarized light. The use of silver in reflection layers has proved to be particularly advantageous in the reflection of p-polarized light. The coating has a thickness of 5 μm to 50 μm and preferably of 8 μm to 25 μm.

If the reflection layer is implemented as a coating, it is preferably applied by physical vapor deposition (PVD) onto the inner pane or the outer pane, particularly preferably by cathodic sputtering ("sputtering"), and most particularly preferably by magnetron-enhanced cathodic sputtering ("magnetron sputtering"). The coating is preferably applied to the outer side of the inner pane, but can, however, also be applied on the inner side of the outer pane. In principle, however, the coating can, for example, also be applied by chemical vapor deposition (CVD), for example, plasma-enhanced chemical vapor deposition (PECVD), by vapor deposition, or by atomic layer deposition (ALD). The coating is preferably applied to the panes prior to lamination.

The reflection layer can also be formed as a reflecting film that reflects p-polarized light. The reflection layer can be a carrier film with a reflecting coating or a reflecting polymer film. The reflecting coating preferably includes at least one layer based on a metal and/or a dielectric layer sequence with alternating refractive indices. The layer based on a metal preferably contains or is made of silver and/or aluminum. The dielectric layers can, for example, be based on silicon nitride, zinc oxide, tin zinc oxide, mixed silicon-metal nitrides, such as silicon-zirconium nitride, zirconium oxide, niobium oxide, hafnium oxide, tantalum oxide, tungsten oxide, or silicon carbide. The oxides and nitrides mentioned can be deposited stoichiometrically, substoichiometrically, or superstoichiometrically. They can have dopants, for example, aluminum, zirconium, titanium, or boron. The reflecting polymer film preferably includes or consists of dielectric polymer layers. The dielectric polymer layers preferably contain PET. If the reflection layer is implemented as a reflecting film, it is preferably from 30 μm to 300 μm thick, particularly preferably from 50 μm to 200 μm, and in particular from 100 μm to 150 μm.

If it is a coated reflecting film, CVD or PVD coating methods can also be used for production.

According to another preferred embodiment of the projection arrangement according to the invention, the reflection layer is implemented as a reflecting film and arranged within the thermoplastic intermediate layer. The advantage of this arrangement is that the reflection layer does not have to be applied to the outer pane or inner pane using thin-film technology (for example, CVD and PVD). This results in uses of the reflection layer with further advantageous functions such as a more homogeneous reflection of the p-polarized light at the reflection layer. In addition, the production of the composite pane can be simplified, since the reflection layer does not have to be arranged on the outer or inner pane via an additional process prior to lamination.

In a particularly preferred embodiment of the invention, the reflection layer is a reflecting film that is metal free and reflects visible light rays with a p-polarization. The reflection layer is a film that functions on the basis of prisms and reflecting polarizers acting synergistically with one another. Such films for use as reflection layers are commercially available, for example, from 3M Company.

In another preferred embodiment of the invention, the reflection layer is a holographic optical element (HOE). The term "HOE" refers to elements that are based on the operating principle of holography. HOEs change the light in the beam path using information stored in the hologram usually as a change in the refractive index. Their function is based on the superposition of plane or spherical light waves whose interference pattern produces the desirable optical effect. HOEs are already used in the transportation sector, for example, in head-up displays. The advantage of using an HOE compared to simply reflecting layers results from a greater geometric design freedom in terms of the arrangement of eye and projector position as well as the respective angles of inclination, e.g., of the projector and reflecting layer. Furthermore, with this variant, double images are particularly strongly reduced or even prevented. HOEs are suitable for displaying real images or even virtual images in different image widths. Moreover, the geometric angle of reflection can be adjusted with the HOE such that, for example, in the case of an application in a vehicle, the information transmitted for the driver can be displayed very well from the desired viewing angle. Advantageously, the reflection layer can improve the properties of the reflected p-polarized light compared to mere reflection of the light at the pane. The proportion of the reflected p-polarized light is comparatively high, with the reflectivity of light being, for example, approx. 90%.

In one particular embodiment of the invention, a high-refractive-index coating is applied to all or to a region of the inner side of the inner pane. The high-refractive-index coating is preferably in direct spatial contact with the inner side of the inner pane. The high-refractive-index coating is arranged at least in a region on the inner side of the inner pane, which, when viewed through the composite pane, is in complete overlap with the reflection layer. This means that the p-polarized light that is projected by the image display device onto the reflection layer passes through the high-refractive-index coating before striking the reflection layer. In the context of the invention, "complete overlap" of an element A with an element B means that the orthonormal projection of element A to the plane of element B is arranged entirely within element B.

The high-refractive-index coating has a refractive index of at least 1.7, particularly preferably at least 1.9, most particularly preferably at least 2.0. The increase in the refractive index brings about a high-refractive effect. The high-refractive-index coating causes a weakening of the reflection of the p-polarized light at the interior-side surface of the inner pane such that the desired reflection of the reflection coating appears with greater contrast.

According to an explanation by the inventors, the effect is based on the increase in the refractive index of the interior-side surface as a result of the high-refractive-index coating. This increases the Brewster angle $\alpha_{Brewster}$ at the interface, since this is known to be determined as $$\alpha_{Brewster} = \arctan\left(\frac{n_2}{n_1}\right),$$

where $n_1$ is the refractive index of air and $n_2$ is the refractive index of the material that the radiation strikes. The high-refractive-index coating with the high refractive index leads to an increase in the effective refractive index of the glass surface and thus to a shift of the Brewster angle to larger values compared to an uncoated glass surface. As a result, with common geometric relations of projection arrangements based on HUD technology, the difference between the incident angle and the Brewster angle becomes smaller such that the reflection of the p-polarized light at the inner side of the inner pane is suppressed and the ghost image generated thereby is weakened.

The high-refractive-index coating is preferably formed from a single layer and has no further layers above or below this layer. A single layer is sufficient to achieve the effect and is technically simpler than applying a layer stack. In principle, however, the high-refractive-index coating can also comprise multiple individual layers, which can be desirable for optimizing certain parameters in the individual case.

Suitable materials for the high-refractive-index coating are silicon nitride ($Si_3N_4$), a mixed silicon-metal nitride (for example, silicon-zirconium nitride (SiZrN), mixed silicon-aluminum nitride, mixed silicon-hafnium nitride, or mixed silicon-titanium nitride), aluminum nitride, tin oxide, manganese oxide, tungsten oxide, niobium oxide, bismuth oxide, titanium oxide, mixed tin-zinc oxide, and zirconium oxide. In addition, transition metal oxides (such as scandium oxide, yttrium oxide, tantalum oxide) or lanthanide oxides (such as lanthanum oxide or cerium oxide) can also be used. The high-refractive-index coating preferably contains one or more of these materials or is based thereon.

The high-refractive-index coating can be applied by physical or chemical vapor deposition, i.e., can be a PVD or CVD coating (PVD: physical vapor deposition, CVD: chemical vapor deposition). Suitable materials on which the coating is preferably based are in particular silicon nitride, a mixed silicon-metal nitride (for example, silicon-zirconium nitride, mixed silicon-aluminum nitride, mixed silicon-hafnium nitride, or mixed silicon-titanium nitride), aluminum nitride, tin oxide, manganese oxide, tungsten oxide, niobium oxide, bismuth oxide, titanium oxide, zirconium oxide, zirconium nitride, or mixed tin-zinc oxide. Preferably, the high-refractive-index coating is a coating applied by cathodic sputtering ("sputtered"), in particular a coating applied by magnetron-enhanced cathodic sputtering ("magnetron sputtered").

Alternatively, the high-refractive-index coating is a sol-gel coating. In the sol-gel method, first, a sol containing the precursors of the coating is provided and ripened. The ripening can involve hydrolysis of the precursors and/or a (partial) reaction between the precursors. The precursors are usually present in a solvent, preferably water, alcohol (in particular, ethanol), or a water-alcohol mixture. In this case, the sol preferably contains silicon oxide precursors in a solvent. The precursors are preferably silanes, in particular tetraethoxysilanes or methyltriethoxysilane (MTEOS). Alternatively, however, silicates can also be used as precursors, in particular sodium, lithium, or potassium silicates, for example, tetramethyl orthosilicate, tetraethyl orthosilicate (TEOS), tetraisopropyl orthosilicate, or organosilanes of the general form R2nSi(OR1)4−n. Here, R1 is preferably an alkyl group; R2 is an alkyl, epoxy, acrylate, methacrylate, amine, phenyl, or vinyl group; and n is an integer from 0 to 2. Silicon halides or alkoxides can also be used. The silicon oxide precursors result in a sol-gel coating of silicon oxide. In order to increase the refractive index of the coating to the value according to the invention, refractive-index-enhancing additives, preferably titanium oxide and/or zirconium oxide, or their precursors, are added to the sol. In the finished coating, the refractive-index-enhancing additives are present in a silicon oxide matrix. The molar ratio of silicon oxide to refractive-index-enhancing additives can be selected freely as a function of the desired refractive index and is, for example, around 1:1.

In principle, in the context of the present invention, refractive indices are, unless otherwise indicated, specified based on a wavelength of 550 nm. Methods for determining refractive indices are known to the person skilled in the art. The refractive indices indicated in the context of the invention can, for example, be determined by ellipsometry, wherein commercially available ellipsometers can be used.

In another particular embodiment of the invention, the high-refractive-index coating is applied on the entire further masking strip or on some regions thereof, with the further masking strip being applied to the inner side of the inner pane. In this connection, the term "on some regions thereof" means that the high-refractive-index coating is arranged partially or completely on the further masking strip, but, in addition, can also be applied on the inner side of the inner pane. This has the advantage that the high-refractive-index layer can be applied to the entire inner pane, regardless of whether a masking strip was previously applied to the inner pane.

The invention further extends to a method for producing a projection arrangement according to the invention. The method comprises:

(a) In a first step, a thermoplastic intermediate layer and a reflection layer are arranged between a transparent outer pane and a transparent inner pane to form a layer stack. The outer pane has an outer side facing away from the thermoplastic intermediate layer and an inner side facing the thermoplastic intermediate layer, and the inner pane has an outer side facing the thermoplastic intermediate layer and an inner side facing away from the thermoplastic intermediate layer. The reflection layer is suitably implemented to reflect p-polarized light. In addition, the reflection layer itself is opaque or it is spatially arranged in front of an opaque background when viewed through the composite pane proceeding from the inner side of the inner pane.
(b) In a second step, the layer stack is laminated to form a composite pane.
(c) in the last step, an image display device is arranged, which is directed at the reflection layer and irradiates it with p-polarized light through the inner pane.

The reflection layer reflects the p-polarized light. The p-polarized light exits the composite pane on the inner side of the inner pane.

The layer stack is laminated under the action of heat, vacuum, and/or pressure, with the individual layers joined to one another (laminated) by at least one thermoplastic intermediate layer. Methods known per se can be used to produce a composite pane. For example, so-called autoclave methods can be carried out at an elevated pressure of approx. 10 bar to 15 bar and temperatures from 130° C. to 145° C. for roughly 2 hours. Vacuum bag or vacuum ring methods known per se operate, for example, at roughly 200 mbar and 130° C. to 145° C. The outer pane, the inner pane, and the thermoplastic intermediate layer can also be pressed in a calender between at least one pair of rollers to form a composite pane. Facilities of this type for producing composite panes are known and normally have at least one heating tunnel upstream from a press. The temperature during the pressing operation is, for example, from 40° C. to 150° C. Combinations of calendering and autoclave methods have proved particularly useful in practice. Alternatively, vacuum laminators can be used. These consist of one or more heatable and evacuable chambers in which the outer pane and the inner pane can be laminated within, for example, about 60 minutes at reduced pressures from 0.01 mbar to 800 mbar and temperatures from 80° C. to 170° C.

The invention further extends to the use of the composite pane according to the invention in means of locomotion for travel on land, in the air, or on water, in particular in motor vehicles, wherein the composite pane can, for example, be used as a windshield, rear window, side windows, and/or roof panel. Use of the composite pane as a vehicle windshield is preferred. Alternatively, the glazing can be an architectural glazing, for example, in an exterior façade of a building or a partition in the interior of a building, or a built-in part in furniture or appliances.

The various embodiments of the invention can be implemented individually or in any combinations. In particular, the features mentioned above and to be explained below can be used not only in the combinations indicated but also in other combinations or in isolation without departing from the scope of the present invention.

Figure 2:
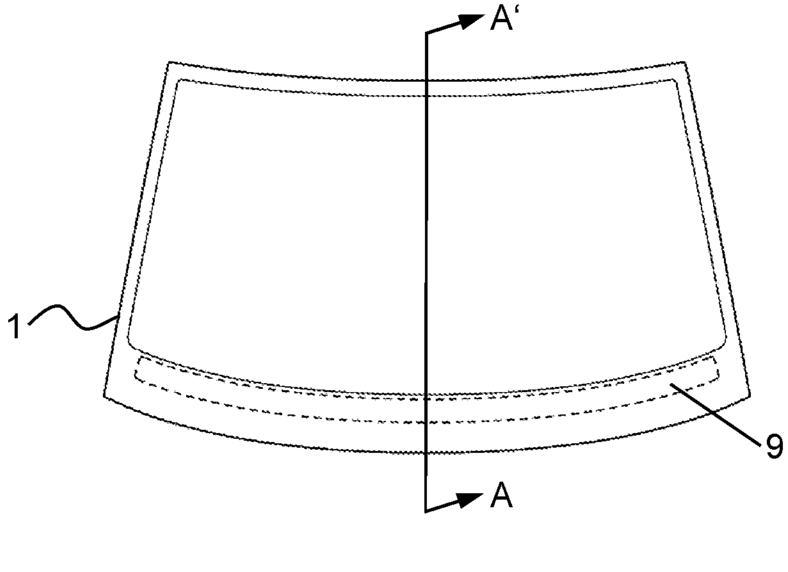
Figure 6:
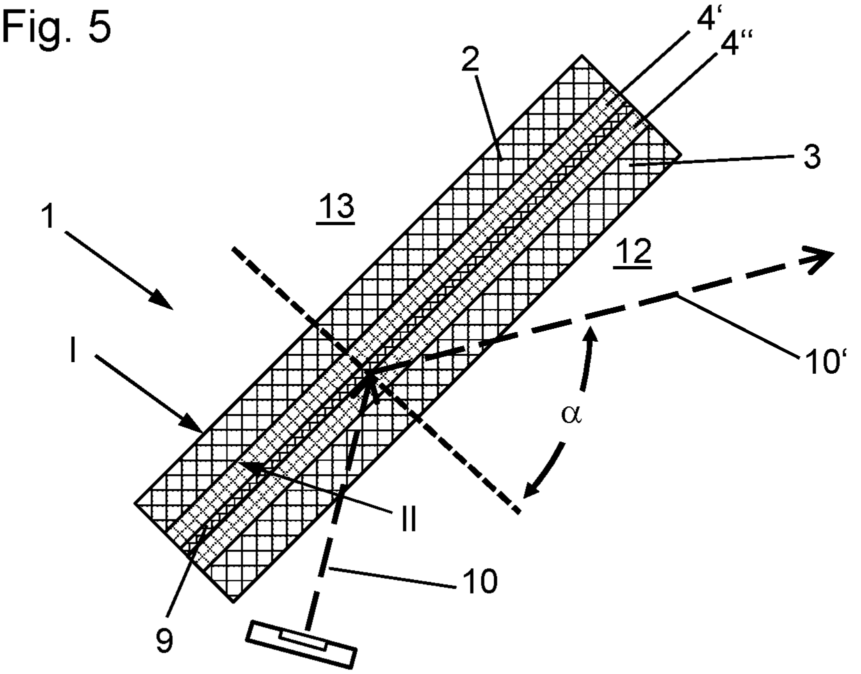
Figure 7:
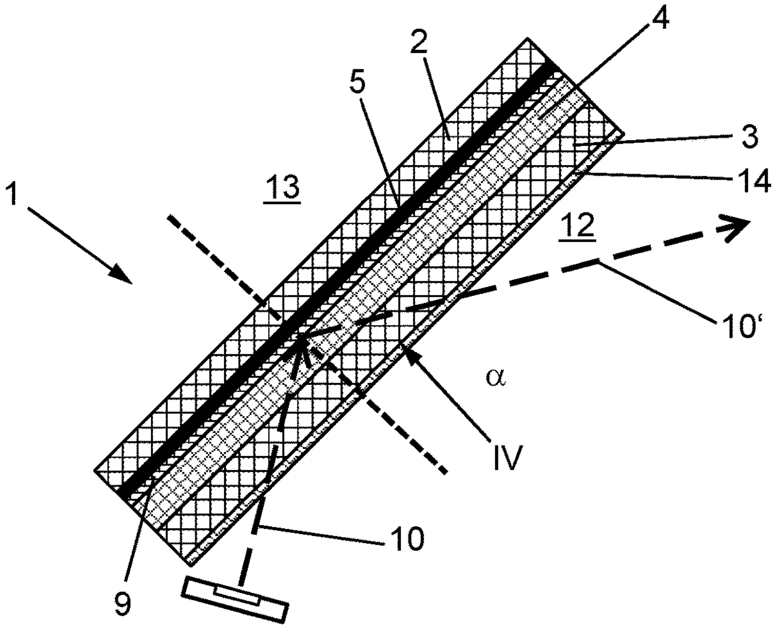
Figure 8:
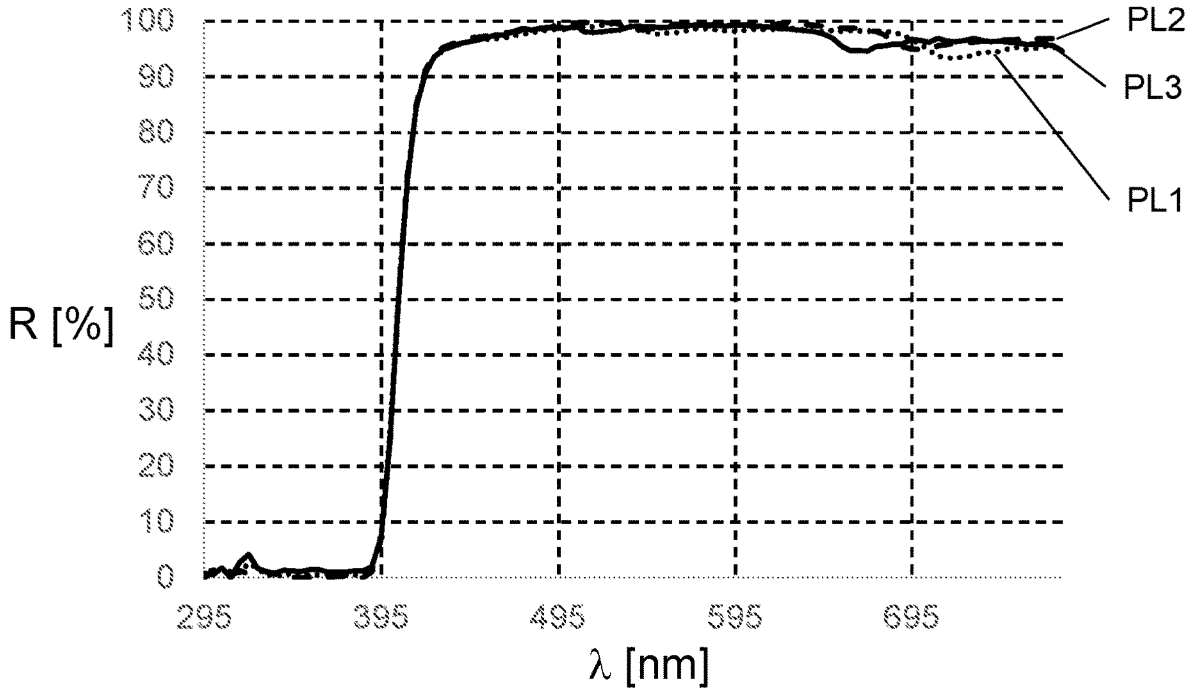
Figure 9:
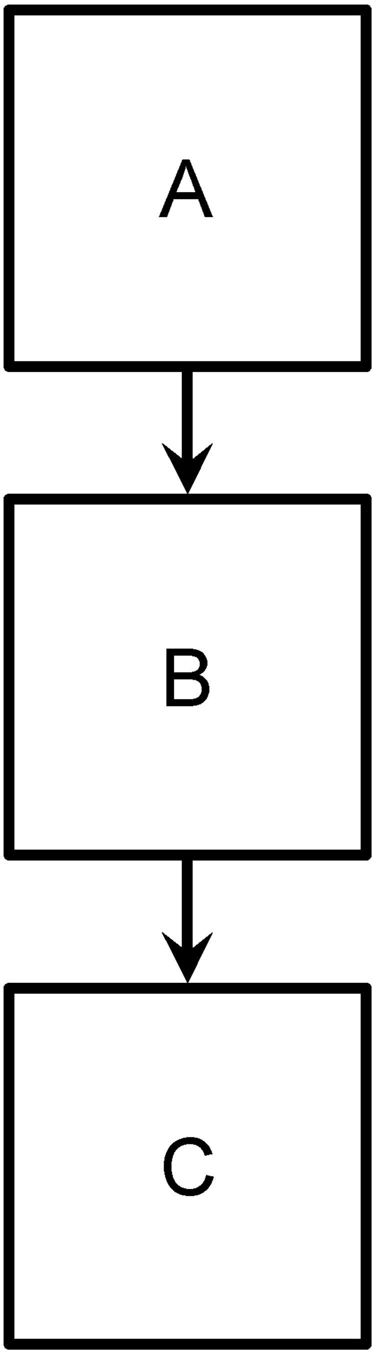

The invention is explained in greater detail in the following using exemplary embodiments with reference to the accompanying figures. They depict, in simplified representation, not to scale:

FIG. 1 a cross-sectional view of an exemplary embodiment of the projection arrangement according to the invention, FIG. 2 a plan view of the composite pane of FIG. 1, FIG. 3-7 enlarged cross-sectional views of various embodiments of the projection arrangement according to the invention, FIG. 8 a diagram showing the measured reflectivity R as a function of the wavelength WL in two different composite panes, and FIG. 9 a flow chart illustrating the method according to the invention.

FIG. 1 depicts a cross-sectional view of an exemplary embodiment of the projection arrangement 100 according to the invention in a vehicle in a highly simplified, schematic representation. A plan view of the composite pane 1 of the projection arrangement 100 is depicted in FIG. 2. The cross-sectional view of FIG. 1 corresponds to the section line A-A of the composite pane 1, as indicated in FIG. 2.

The composite pane 1 is implemented in the form of a composite pane (cf. FIG. 3 through 4) and comprises an outer pane 2 and an inner pane 3 with a thermoplastic intermediate layer 4, which is arranged between the panes. The composite pane 1 is, for example, installed in a vehicle and separates a vehicle interior 12 from external surroundings 13. The composite pane 1 is, for example, the windshield of a motor vehicle.

The outer pane 2 and the inner pane 3 are made in each case of glass, preferably thermally toughened soda lime glass and are transparent to visible light. The thermoplastic intermediate layer 4 consists of a thermoplastic, preferably polyvinyl butyral (PVB), ethylene vinyl acetate (EVA), and/or polyethylene terephthalate (PET).

The outer side I of the outer pane 2 faces away from the thermoplastic intermediate layer 4 and is, at the same time, the outer surface of the composite pane 1. The inner side II of the outer pane 2 and the outer side III of the inner pane 3 face the intermediate layer 4 in each case. The inner side IV of the inner pane 3 faces away from the thermoplastic intermediate layer 4 and is, at the same time, the inner side of the composite pane 1. It goes without saying that the composite pane 1 can have any suitable geometric shape and/or curvature. As a composite pane 1, it typically has convex curvature.

In an edge region 11 of the composite pane 1, there is a frame-like circumferential first masking strip 5 on the inner side II of the outer pane 2. The first masking strip 5 is opaque and prevents the view of structures arranged to the inside of the composite pane 1, for example, an adhesive bead for gluing the composite pane 1 into a vehicle body. The first masking strip 5 is preferably black. The first masking strip 5 is made of an electrically nonconductive material conventionally used for masking strips, for example, a black colored screen printing ink that is baked.

Furthermore, the composite pane 1 has, in the edge region 11 on the inner side IV of the inner pane 3, a second masking strip 6. The second masking strip 6 is implemented circumferentially in a frame-like manner. Like the first masking strip 5, the second masking strip 6 is made of an electrically nonconductive material conventionally used for masking strips, for example, a black colored screen printing ink that is baked.

On the first masking strip 5, there is a reflection layer 9 that is vapor deposited by means of a PVD method. When viewed through the composite pane 1, the reflection layer 9 does not coincide with the second masking strip 6. The reflection layer 9 is, for example, a metal coating that contains at least one thin-layer stack with at least one silver layer and one dielectric layer. Alternatively, the reflection layer 9 can also be implemented as a reflecting film and be arranged on the first masking strip 5. The reflecting film can include a metal coating or, however, be made of dielectric polymer layers in a layer sequence. Combinations of these variants are also possible.

When viewed through the composite pane 1, the reflection layer 9 is arranged in overlap with the first masking strip 5, with the first masking strip 5 completely overlapping the reflection layer 9, i.e., the reflection layer 9 has no section that is not in overlap with the first masking strip 5. Here, the reflection layer 9 is, for example, arranged only in the lower (engine-side) section 11' of the edge region 11 of the composite pane 1. However, it would also be possible to arrange the reflection layer 9 in the upper (roof-side) section 11" or in a lateral section of the edge region 11. Furthermore, a plurality of reflection layers 9 can be provided, arranged, for example, in the lower (engine-side) section 11' and in the upper (roof-side) section 11" of the edge region 11. For example, the reflection layers 9 could be arranged such that a (partially) circumferential image is generated.

The first masking strip 5 is widened in the lower (engine-side) section 11' of the edge region 11, i.e., the first masking strip 5 has in the lower (engine-side) section 11' of the edge region 11 a greater width than in the upper (roof-side) section 11" of the edge region 11 (as also in the lateral sections of the edge region 11, not visible in FIG. 1) of the composite pane 1. “Width” means the dimension of the first masking strip 5 perpendicular to its extension. Here, the reflection layer 9 is arranged, for example, above the second masking strip 6 (in other words, not in overlap).

The projection arrangement 100 further has an image display device 8 as an image generator arranged in the dashboard 7. The image display device 8 is used to generate p-polarized light 10 (image information) that is directed at the reflection layer 9 and is reflected by the reflection layer 9 as reflected light 10' into the vehicle interior 12, where it can be seen by a viewer, e.g., driver. The reflection layer 9 is suitably designed to reflect the p-polarized light 10 of the image display device 8, i.e., an image from the image display device 8. The p-polarized light 10 of the image display device 8 preferably strikes the composite pane 1 at an angle of incidence of 50° to 80°, in particular of 60° to 70° 1, typically approx. 65°, as is customary with HUD projection arrangements. It would also, for example, be possible to arrange the image display device 8 in the A pillar of a motor vehicle or on the roof (on the vehicle-interior side, in each case), if the reflection layer 9 is suitably positioned for this. When multiple reflection layers 9 are provided, a separate image display device 8 can be associated with each reflection layer 9, i.e., multiple image display devices 8 can be arranged. The image display device 8 is, for example, a display, such as an LCD display, OLED display, EL display, or µLED display. It would also be possible, for example, for the composite pane 1 to be a roof panel, side pane, or rear pane.

The plan view of FIG. 2 shows the reflection layer 9 extending along the lower section 11' of the edge region 11 of the composite pane 1.

Reference is now made to FIG. 3 through 7, wherein enlarged cross-sectional views of various embodiments of the composite pane 1 are depicted. The cross-sectional views of FIG. 3 through 7 correspond to the section line A-A in the lower section 11' of the edge region 11 of the composite panel, as indicated in FIG. 2.

Figure 3:
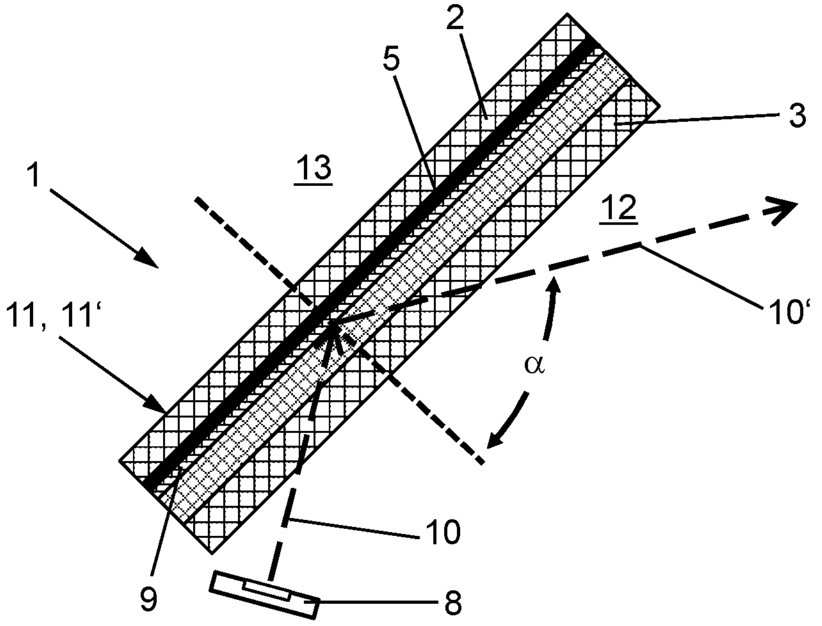

In the variants of the composite pane 1 depicted in FIG. 3, the first (opaque) masking strip 5 is situated on the inner side II of the outer pane 2. The reflection layer 9 is applied directly on the first masking strip 5. The p-polarized light 10 from the image display device 8 is reflected by the reflection layer 9 as reflected light 10' into the vehicle interior 12. The p-polarization of the light 10, 10' is schematically illustrated. Due to the angle of incidence of the p-polarized light 10 on the composite pane 1 close to Brewster's angle, the p-polarized light 10 is hardly impeded in transmittance through the inner pane 3. This variant has the advantage that a relatively large share of the incident p-polarized light 10 is reflected; and, then, due to the fact that the angle of incidence is equal to the angle of reflection (depicted in FIGS. 3 and 4 by α), is transmitted, largely unimpeded, through the inner pane 3 into the vehicle interior 12. In addition, the image is readily recognizable against the background of the opaque (first) masking layer 5 with high contrast.

Figure 4:
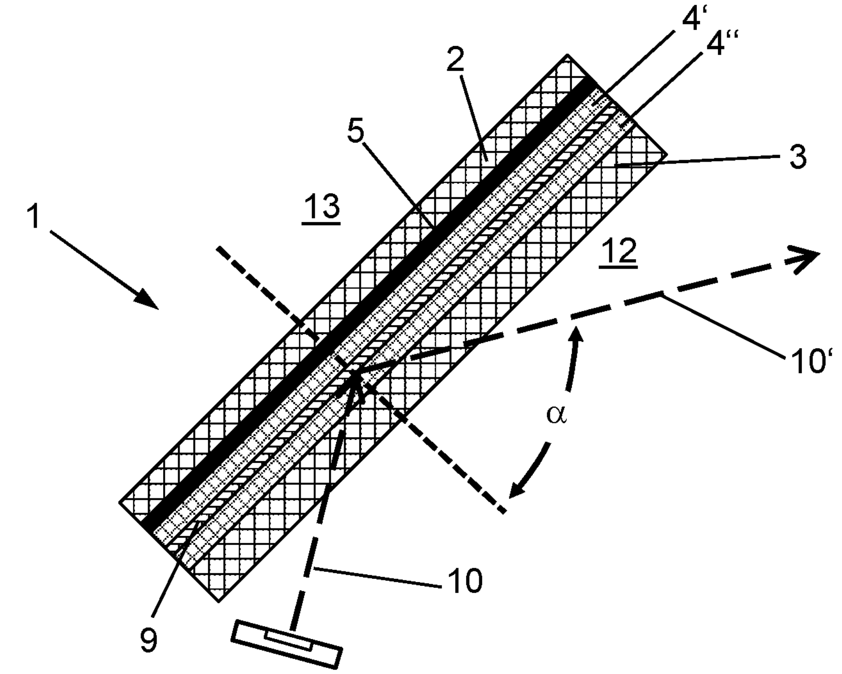

The variant of the composite pane 1 depicted in FIG. 4 differs from the variant of FIG. 3 only in that the reflection layer 9 is implemented as a reflecting film that reflects p-polarized light 10 into the vehicle interior 12. This variant represents a viable alternative to the reflection layer 9 shown in FIGS. 1 and 3, which is, for example, vapor deposited onto the masking strip 5 using the PVD technique.

As a further difference from the variant of FIG. 3, the reflection layer 9 in FIG. 4 is laminated between two thermoplastic intermediate layers 4', 4" (e.g., PVB films) in the composite pane 1. In order to compensate for height differences (thickness jump) caused by the reflection layer 9 relative to the rest of the composite pane 1, it is advantageous for the thermoplastic intermediate layers 4, 4' to have a correspondingly smaller thickness than outside the region, where the reflection layer 9 is not provided.

Thus, a uniform distance (i.e., constant total thickness) between the outer pane 2 and the inner pane 3 can be achieved such that any glass breakage during lamination is reliably and safely avoided. When, for example, PVB films are used, they have a smaller thickness in the region of the reflection layer 9 than where no reflection layer 9 is provided. In addition, the image is easily recognizable against the background of the opaque (first) masking layer 5 with high contrast. In the interior of the composite pane 1, the reflection layer 9 is well protected against external influences.

Figure 5:
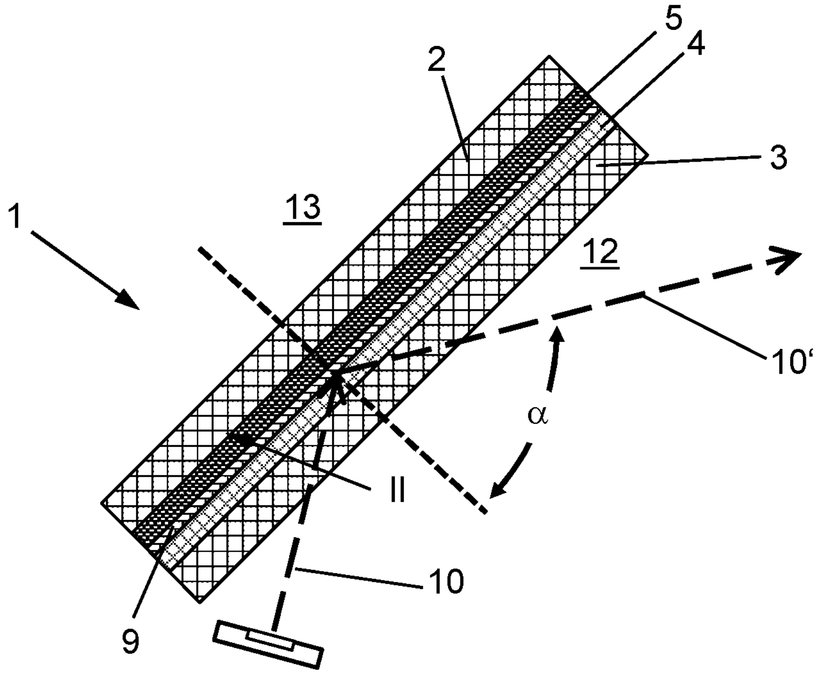

The variant of the composite pane 1 depicted in FIG. 5 differs from the variant of FIG. 4 only in that the first (opaque) masking strip 5 is implemented as a thermoplastic intermediate layer impermeable to light that is arranged on the inner side II of the outer pane 2. The first masking strip 5 is formed, for example, based on a colored PVB, EVA, or PET film. In this case, the reflection layer 9 is laminated between the thermoplastic intermediate layer 4 and the first masking strip 5.

The variant of the composite pane 1 depicted in FIG. 6 differs from the variant of FIG. 4 only in that no (opaque) masking strip 5 is arranged on the outer or inner side I, II of the outer pane 2 and the reflection layer 9 itself is opaque. The reflection layer 9 is, for example, a reflecting film impermeable to light that is arranged within innerhalb the thermoplastic intermediate layer 4', 4". Due to the opacity of the reflection layer 9, the reflectivity for p-polarized light 10 is above 90%. The reflected, projected image is thus well recognizable for the viewer.

The variant of the composite pane 1 depicted in FIG. 7 differs from the variant of FIG. 3 only in that a high-refractive-index coating 14 is arranged on the inner side IV of the inner pane 3. The high-refractive-index coating 14 is applied, for example, by means of the sol-gel method and consists of a titanium oxide coating. Due to the higher refractive index (for example, 1.7) of the high-refractive-index coating 14 compared to the inner pane 3, the Brewster angle, normally at approx. 56.5° (for soda lime glass) can be enlarged, which simplifies the application and reduces the effect of disruptive double images due to reflection at the inner side IV of the inner pane 3.

In all exemplary embodiments, the reflection layer 9 is arranged on the vehicle-interior side of the first masking strip 5, i.e., when viewed from the inner side of the composite pane 1, the reflection layer 9 is arranged in front of the first masking strip 5.

FIG. 8 shows, using a diagram, the measured reflectivity R (in % of the incident p-polarized light 10) as a function of the wavelength λ (nm) with different angles of incidence of the p-polarized light 10 on the composite pane 1. The measurements were made at an angle of 50° (PL1), 55° (PL2), and 65° (PL3) relative to the normal. The curves relate to a composite pane 1 with a reflection layer 9 that is arranged on the masking strip 5. In this case, the masking strip 5 is arranged on the inner side II of the outer pane 2.

It can be seen that the reflectivity at all angles is from 90% to 100% for wavelengths >395 nm.

FIG. 9 illustrates the method according to the invention by means of a flow chart.

A: A thermoplastic intermediate layer 4 and a reflection layer 9 are arranged between a transparent outer pane 2 and a transparent inner pane 3 to form a layer stack. The reflection layer 9 is itself opaque or is arranged spatially farther from the outer side I of the outer pane 2 than an opaque background, for example, a masking strip 5 that is arranged on the outer side I or inner side II of the outer pane 2 or between the outer pane 2 and the inner pane 3.

B: The layer stack is laminated to form a composite pane 1.

C: An image display device 8 is arranged on the composite pane 1, wherein the emitting element of the image display device 8 is associated with the reflection layer 9 and the reflection layer 9 is irradiated through the inner pane 3 with a p-polarized light 10, with the reflection layer 9 reflecting the p-polarized light 10.

It follows from the above statements that the invention makes available an improved projection arrangement that enables a good image display with high contrast. Unwanted secondary images can be avoided. The projection arrangement according to the invention can be produced simply and economically using known production methods.

1 composite pane
2 outer pane
3 inner pane
4, 4', 4" thermoplastic intermediate layer
5 first masking strip
6 second masking strip
7 dashboard
8 image display device
9 reflection layer
10,10' p-polarized Licht
11, 11, 11" edge region
12 vehicle interior
13 external surroundings
14 high-refractive-index coating
100 projection arrangement
I outer side of the outer pane 2
II inner side of the outer pane 2
III outer side of the inner pane 3
IV inner side of the inner pane 3
A-A' section line

The invention claimed is:

1. A projection arrangement comprising:

a composite pane comprising a transparent outer pane, a thermoplastic intermediate layer, a reflection layer, and a transparent inner pane, wherein the outer pane has an outer side facing away from the thermoplastic intermediate layer and an inner side facing the thermoplastic intermediate layer and the inner pane has an outer side facing the thermoplastic intermediate layer and an inner side facing away from the thermoplastic intermediate layer, wherein the reflection layer is arranged between the outer pane and the inner pane and is adapted to reflect p-polarized light, wherein the reflection layer itself is opaque or is arranged spatially in front of an opaque background when viewed through the composite pane proceeding from the inner side of the inner pane, and an image display device that is directed at the reflection layer and irradiates it with p-polarized light through the inner pane, wherein the reflection layer reflects the p-polarized light.

2. The projection arrangement according to claim 1, wherein the reflection layer reflects 30% or more of the p-polarized light incident on the reflection layer.

3. The projection arrangement according to claim 2, wherein the reflection layer reflects 50% or more of the p-polarized light incident on the reflection layer.

4. The projection arrangement according to claim 1, wherein the image display device is an LCD display, LED display, OLED display, or an electroluminescent display.

5. The projection arrangement according to claim 4, wherein the image display device is an LCD display.

6. The projection arrangement according to claim 1, wherein the opaque background is implemented as at least one masking strip and is arranged in an edge region of the outer pane.

7. The projection arrangement according to claim 6, wherein the at least one masking strip is arranged on the inner side of the outer pane.

8. The projection arrangement according to claim 7, wherein the reflection layer is arranged on the masking strip on the inner side of the outer pane.

9. The projection arrangement according to claim 6, wherein the reflection layer is arranged on the outer side of the inner pane.

10. The projection arrangement according to claim 6, wherein the at least one masking strip is implemented circumferentially in the edge region of the composite pane, and has, in a section that is in overlap with the reflection layer, a greater width than in sections different therefrom.

11. The projection arrangement according to claim 1, wherein the reflection layer is a coated or uncoated film and is arranged within the thermoplastic intermediate layer.

12. The projection arrangement according to claim 1, wherein the reflection layer contains at least one metal.

13. The projection arrangement according to claim 12, wherein the reflection layer is applied to the outer pane, the opaque background, the inner pane, and/or a film by a vapor deposition process.

14. The projection arrangement according to claim 13, wherein the reflection layer is applied to the outer pane, the opaque background, the inner pane, and/or a film by CVD process or PVD process.

15. The projection arrangement according to claim 12, wherein the at least one metal is silver.

16. The projection arrangement according to claim 1, wherein the reflection layer consists of a metal-free, reflecting film.

17. The projection arrangement according to claim 1, wherein a high-refractive-index coating with a refractive index of at least 1.7 is arranged at least in a region of the inner side of the inner pane that is in complete overlap with the reflection layer.

18. A method for producing a projection arrangement according to claim 1, comprising:

(a) arranging a transparent outer pane, a thermoplastic intermediate layer, a reflection layer, and a transparent inner pane to form a layer stack, wherein the outer pane has an outer side facing away from the thermoplastic intermediate layer and an inner side facing the thermoplastic intermediate layer and the inner pane has an outer side facing the thermoplastic intermediate layer and an inner side facing away from the thermoplastic intermediate layer, wherein the reflection layer is arranged between the outer pane and the inner pane and is adapted to reflect p-polarized light, and wherein the reflection layer itself is opaque or is arranged spatially in front of an opaque background when viewed through the layer stack proceeding from the inner side of the inner pane, (b) laminating the layer stack to form a composite pane, and (c) arranging an image display device that is directed at the reflection layer and irradiates it with p-polarized light through the inner pane, wherein the reflection layer reflects the p-polarized light.

19. A method comprising providing a projection arrangement according to claim 1 in a vehicle for travel on land, in the air, or on water.

20. The method according to claim 19, wherein the composite pane is a windshield.

21. The projection arrangement according to claim 1, wherein a light transmittance of the opaque reflection layer and the opaque background is less than 10%.

* * * * *